No. 853,792. PATENTED MAY 14, 1907.
G. E. HUGULEY.
VEHICLE TIRE.
APPLICATION FILED JUNE 19, 1906.
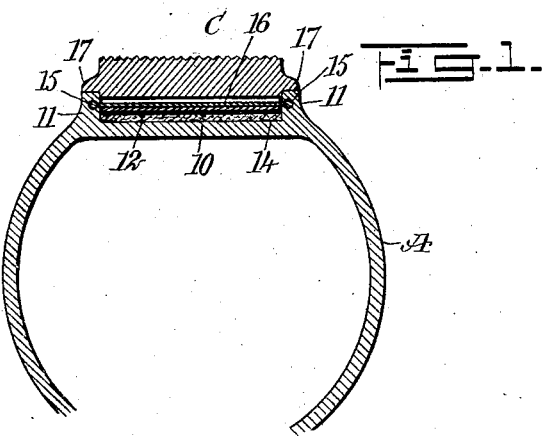
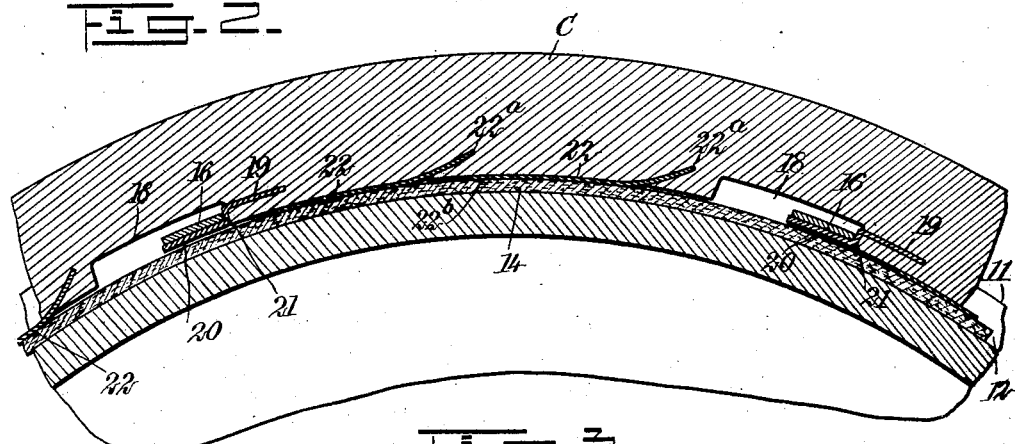
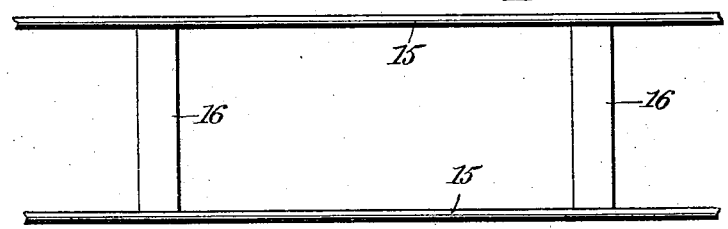
WITNESSES
INVENTOR
George E. Huguley
BY
ATTORNEYS

UNITED STATES PATENT OFFICE.

GEORGE E. HUGULEY, OF ATLANTA, GEORGIA.

VEHICLE-TIRE.

No. 853,792.  Specification of Letters Patent.  Patented May 14, 1907.

Application filed June 19, 1906. Serial No. 322,375.

*To all whom it may concern:*

Be it known that I, GEORGE E. HUGULEY, a citizen of the United States, and a resident of Atlanta, in the county of Fulton and State of Georgia, have invented a new and Improved Vehicle-Tire, of which the following is a full, clear, and exact description.

The purpose of the invention is to provide a supplemental tread section for the outer tubes of pneumatic tires, or any rubber tire used upon the wheels of automobiles or similar heavy vehicles, which supplemental tread section can be quickly, conveniently and firmly applied.

A further purpose of the invention is to so construct said supplemental tread section that it will add materially to the resiliency of the tire to which it is applied, and so that the fastening devices will not detract from said resiliency; and also to so construct the supplemental tread section that it will render the outer tube comparatively punctureless at the tread and so that should the supplemental section become unduly worn or damaged it can be removed and replaced by another without damage to the main tire.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a transverse section through a portion of the outer tube of a vehicle tire and through the supplemental tread section applied; Fig. 2 is an enlarged circumferential sectional side view through a portion of the supplemental tread section of the tire and the outer tire; and Fig. 3 is a plan view of the keeper device carried by the outer tire and constituting a portion of the locking mechanism employed to connect the main and supplemental tires.

A represents the outer tube of the pneumatic tire, which tube is provided with a flat tread section 10 and with a circumferential wall 11 at each side of the tread section, forming thereby a tread channel 12. A strip 14 of raw-hide is made to lie close upon the bottom wall of the tread channel 12 as is shown in Figs. 1 and 2; and the said strip extends from one side wall of said channel, and in this channel 12 a keeper device B is secured, which device as is shown in Fig. 3, consists of parallel rods 15 of wire of suitable gage, connected at suitable intervals by transverse plates 16. When the outer tube A is molded the wires or rods 15 are molded in the walls 11 of the tread channel 12, the plates 16 extending from one side wall of the channel to the other as shown best in Fig. 1, constituting a series of keeper plates which may be at any suitable distance apart.

C represents the supplemental tread section of the tire. This tread section extends entirely around the tube A and is provided with side flanges 17 which rest upon the walls 11 of the tread channel 12 as is shown in Fig. 1. This supplemental tread section C extends any desired distance beyond the outer face of the walls 11 of said tread channel 12 and enters said channel, the inner face of said supplemental tread section C being made to bear against the rawhide strip 14, as shown best in Fig. 2. In the inner face of the supplemental tread section, a series of recesses 18 is produced, which recesses are spaced apart correspondingly to the keeper plates 16 in the channel 12 of the outer tube A, since when the supplemental tread section C is placed in position upon the outer tube A a keeper plate 16 will be received in each recess 18 of said supplemental tread section as is shown in Fig. 2.

At each recess 18 in the supplemental tread section C a latch is employed. This latch consists of a shank 19 preferably in the form of a flat plate as shown in Fig. 2, which shank extends through the end wall of a recess 18 and is vulcanized in the body portion of said supplemental tread section; and a flat foot member 20 which is connected with the shank 19 by a connecting member 21 at right angles to said foot member and shank. The connecting member 21 extends down along the end wall of the recess 18 at which the latch is applied, and the foot member 20 extends circumferentially within the recess 18; the length of the said connecting member 21 is such that when the supplemental tread section C is placed in position in the channel 12 of the outer tube A the foot members 20 of all of the latches can be slid under the keeper plates 16 in the tread channel 12 of the outer tube A, thus securing said segmental tread section C to the outer tube as clearly shown in Fig. 2.

In order to prevent the passage of pins or sharp instruments through the segmental tread section C and into the outer tube A, armor plates 22 are placed in engagement with the inner face of the segmental tread section C, as shown in Fig. 2 by bearing upon the outer face of the rawhide strip 14; and each armor plate 22 at one end is introduced a comparatively short distance into the body of the supplemental tread section C, being vulcanized therein. The rawhide strip 14 prevents any tendency on the part of the exposed portions of the armor plates 22 and the foot members of the latches possibly wearing the outer face of the outer tube A.

The supplemental tread section C adds greatly to the strength of a tire and further adds to its resiliency. The attachment as here made does not detract from said resiliency and yet it affords a secure connection between the outer tube and the supplemental tread.

It is obvious that when necessary the supplemental tread section C can be quickly and conveniently removed and substituted by another if so desired. It is furthermore evident that the supplemental tread section C does not in any manner interfere with the inner or inflated tube when such is employed.

Having thus described my invention, I claim as new, and desire to secure by Letters Patent,—

1. In vehicle tires, an outer tube having an exterior annular channel at its tread portion, transversely extending keepers secured in said channel at a distance from its bottom wall, a supplemental tread section adapted to cover and to enter the said channel, and latches located at the inner face of the said tread section and arranged to pass between the said keepers and the bottom wall of the said channel.

2. In a vehicle tire, an outer tube section provided with a peripheral annular channel at its tread, keeper plates extending from side to side of said channel and secured to the said tube, the keeper plates being spaced from the bottom wall of the channel, a supplemental tread section which covers the said channel and extends therein, said supplemental tread section being provided with a series of recesses in its inner face, the distance between the recesses corresponding substantially to the distance between the keeper plates in said channel, a latch located at an end side wall of each recess, which latches are secured to the supplemental tread section, said latches being adapted to pass beneath the keeper plates, and a protective strip located upon the bottom wall of the said tread channel on the outer tube, against which protective strip the said latches have bearing.

3. In a vehicle tire, an outer tube provided with a peripheral annular channel at its tread, wires vulcanized in the side walls of said channel, keeper plates secured to the wires and extending from one wall to the other, crossing the said channel, a supplemental tread section extending into said channel and beyond the outer face of the said outer tube, protective plates engaging with the inner face of the supplemental tread section, which plates have an end secured in the said supplemental tread section, and latches located at the inner side portions of the said supplemental tread section, to pass beneath the keeper plates in the channel of the outer tube.

4. In a vehicle tire, an outer tube provided in its tread with an annular channel and having keepers extending transversely of the channel and spaced from the bottom thereof, and a supplemental tread section extending into the channel, said supplemental tread section being provided in its inner face with recesses corresponding in number to the keepers of the channel and with latches projecting into the recesses with their lower faces flush with the inner face of the supplemental tread and extending beneath the keepers in the channel of the outer tube.

5. In a vehicle tire, an outer tube provided in its tread with an annular channel, wires vulcanized in the walls of the channel and connected by plates, said plates extending across the channel and spaced from the bottom thereof, a supplemental tread section extending into the channel and provided on its inner face with recesses corresponding in number to the plates in the channel, and latches vulcanized in the supplemental tread section and projecting into the recesses thereof with their lower faces flush with the inner face of the supplemental tread and extending beneath the plates in the channel of the outer tube.

In testimony whereof I have signed my name to this specification in the presence of two subscribing witnesses:

GEORGE E. HUGULEY.

Witnesses:
B. J. SMITH,
RANDOLPH DIXON.